US009235361B2

(12) United States Patent
Ito et al.

(10) Patent No.: US 9,235,361 B2
(45) Date of Patent: Jan. 12, 2016

(54) PRINTER INCLUDING DISPLAY FOR DISPLAYING PAPER REGISTRATION SCREEN

(71) Applicant: SEIKO EPSON CORPORATION, Tokyo (JP)

(72) Inventors: Akemi Ito, Nagano (JP); Ikumi Watanabe, Nagano (JP); Reiko Nomura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/218,065

(22) Filed: Mar. 18, 2014

(65) Prior Publication Data
US 2014/0293334 A1 Oct. 2, 2014

(30) Foreign Application Priority Data
Mar. 29, 2013 (JP) ................. 2013-071638

(51) Int. Cl.
G06F 3/12 (2006.01)
G06K 15/00 (2006.01)
H04N 1/00 (2006.01)
G03G 15/00 (2006.01)

(52) U.S. Cl.
CPC ............ *G06F 3/1204* (2013.01); *G03G 15/502* (2013.01); *G03G 15/6502* (2013.01); *G06F 3/1232* (2013.01); *G06F 3/1254* (2013.01); *G06K 15/005* (2013.01); *H04N 1/0035* (2013.01); *G03G 15/5012* (2013.01)

(58) Field of Classification Search
USPC .................................................. 358/1.15, 1.1
See application file for complete search history.

(56) References Cited

U.S. PATENT DOCUMENTS

| 5,199,694 | A | * | 4/1993 | Iseda | 271/9.05 |
| 6,512,599 | B1 | * | 1/2003 | Hattori | 358/442 |
| 2006/0262337 | A1 | * | 11/2006 | Kamata et al. | 358/1.13 |
| 2006/0285900 | A1 | * | 12/2006 | Kurita | 399/361 |
| 2008/0063424 | A1 | * | 3/2008 | Tanaka et al. | 399/79 |
| 2009/0009783 | A1 | * | 1/2009 | Negishi | 358/1.9 |

FOREIGN PATENT DOCUMENTS

JP 2002-278377 A 9/2002

* cited by examiner

Primary Examiner — Martin Mushambo
(74) Attorney, Agent, or Firm — Global IP Counselors, LLP

(57) ABSTRACT

A printer includes a printing unit, a paper feeding unit, a display unit and a control unit. The printing unit is configured and arranged to execute printing. The paper feeding unit is configured and arranged to hold paper. The display unit is configured and arranged to display a paper registration screen for registering or confirming attributes of the paper according to an operation on the paper feeding unit. The control unit is configured not to display the paper registration screen when non-display conditions have been satisfied even when the operation is performed.

9 Claims, 3 Drawing Sheets

PRINTER INCLUDING DISPLAY FOR DISPLAYING PAPER REGISTRATION SCREEN

CROSS-REFERENCE TO RELATED APPLICATIONS

This application claims priority to Japanese Patent Application No. 2013-071638 filed on Mar. 29, 2013. The entire disclosure of Japanese Patent Application No. 2013-071638 is hereby incorporated herein by reference.

BACKGROUND

1. Technical Field

The present invention relates to a printer.

2. Related Art

From the past, printers are known for which when a paper feeding cassette is inserted or removed, a paper registration screen is displayed for guiding or changing the registration contents for the attributes of paper housed in that cassette (for example, see Japanese Unexamined Patent Publication No. 2002-278377).

SUMMARY

However, in the past, technology was not known by which the printing job was executed without displaying the paper registration screen when it is unsuitable to display the paper registration screen even when a paper feeding cassette was inserted or removed. If the paper registration screen is displayed without exception when the paper feeding cassette is inserted or removed, there is the problem that the user is forced to input the paper attributes unnecessarily, and printing is delayed.

A printer according to one aspect includes a printing unit, a paper feeding unit, a display unit and a control unit. The printing unit is configured and arranged to execute printing. The paper feeding unit is configured and arranged to hold paper. The display unit is configured and arranged to display a paper registration screen for registering or confirming attributes of the paper according to an operation on the paper feeding unit. The control unit is configured not to display the paper registration screen when non-display conditions have been satisfied even when the operation is performed.

With the present invention, it is possible to inhibit the problem of the user being forced to input paper attributes unnecessarily and printing being delayed.

BRIEF DESCRIPTION OF THE DRAWINGS

Referring now to the attached drawings which form a part of this original disclosure.

DETAILED DESCRIPTION OF EXEMPLARY EMBODIMENTS

Following, we will describe modes of carrying out the invention while referring to the attached drawings. Note that for corresponding constitutional elements in each drawing, the same code numbers are given, and redundant descriptions will be omitted.

1. Printer Summary

Figure 1:
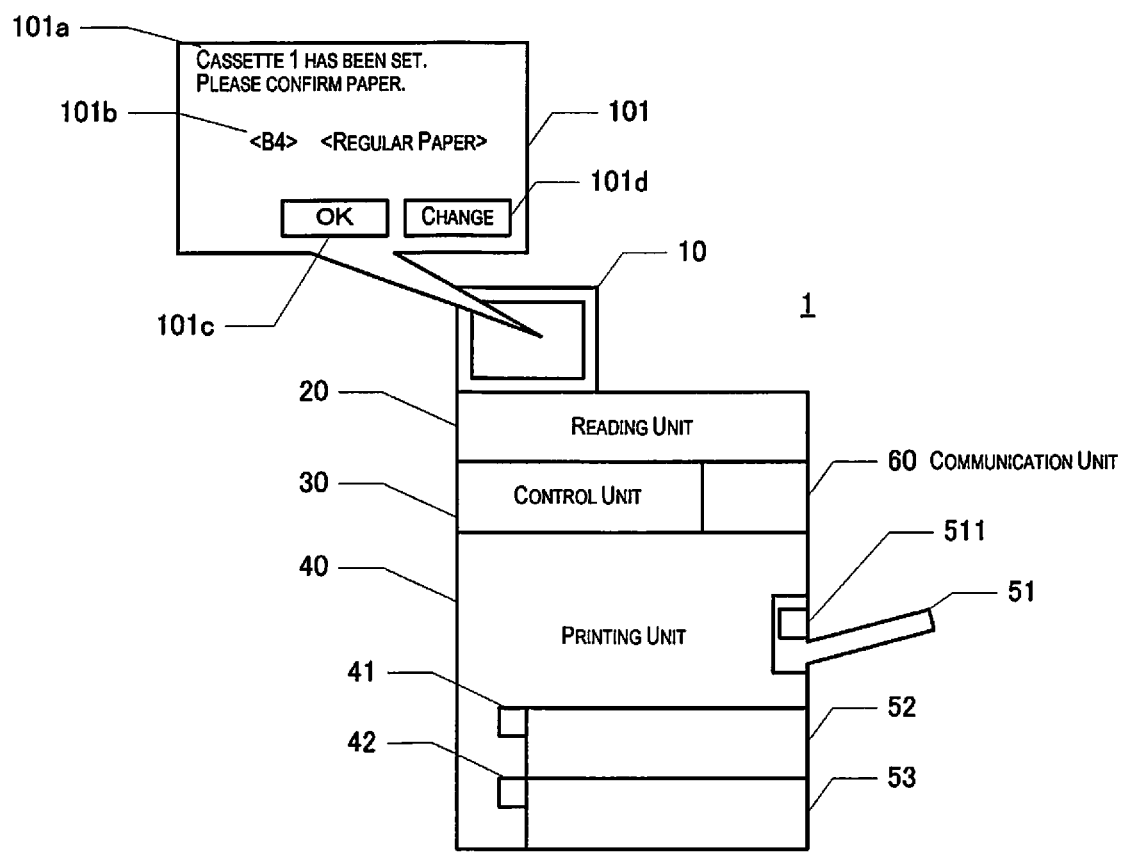
FIG. 1 is a block diagram of an embodiment of the present invention.

FIG. 1 shows a printer 1 as an embodiment of the present invention. The printer 1 is a compound machine equipped with a function for executing printing according to requests from an external device such as a PC or the like, a fax sending and receiving function, and a copying function, and is equipped with a display unit 10, a reading unit 20, a control unit 30, a communication unit 60, a printing unit 40, and paper feeding units 51, 52, and 53. The display unit 10 is a user interface for operating the printer 1, and is equipped with a touch panel. The reading unit 20 is a well known scanner for outputting to the control unit 30 the image data read from the original copy. The printing unit 40 is a mechanism for forming an image on paper using a well known inkjet method, laser method or the like. The communication unit 60 is a mechanism for communication with an external device via a LAN (Local Area Network), telephone line, the interne or the like in compliance with a well known communication standard. The paper feeding units 51, 52, and 53 are mechanisms which each hold paper, and supply paper to the printing unit 40.

The paper feeding unit 51 is a well known multipurpose tray which is fixed to the printing unit 40 without being able to be inserted or removed. The multipurpose tray 51 is equipped with a sensor 511 for detecting whether or not paper is placed in the multipurpose tray 51. The multipurpose tray 51 has the surface for placing paper exposed, and is provided with a sliding type guide for holding paper of various sizes in the multipurpose tray 51.

The paper feeding units 52 and 53 are well known paper feeding cassettes that can be inserted in and removed from the printing unit 40. The paper feeding cassettes 52 and 53 can be stored in the storage chamber provided in the printing unit 40, and this has a box shape in which paper can be placed. Sliding type guides for holding paper of different sizes are also provided inside the paper feeding cassettes 52 and 53. The printing unit 40 is equipped with sensors 41 and 42 for detecting the insertion state and the removal state of the paper feeding cassettes 52 and 53 in the printing unit 40.

The control unit 30 is equipped with items that are not illustrated including a CPU, memory, an input/output mechanism, a non-volatile storage medium, an image processing ASIC (Application Specific Integrated Circuit) and the like, and the display unit 10, the reading unit 20, the communication unit 60, the printing unit 40, and the paper feeding units 51, 52, and 53 are controlled by executing the control program stored in the non-volatile storage medium, realizing functions such as printing, sending and receiving faxes, image reading, the user interface and the like. The non-volatile storage medium of the control unit 30 stores the attributes of the paper registered respectively correlated to the paper feeding units 51, 52, and 53.

2. Printer Control Method

Figure 2:
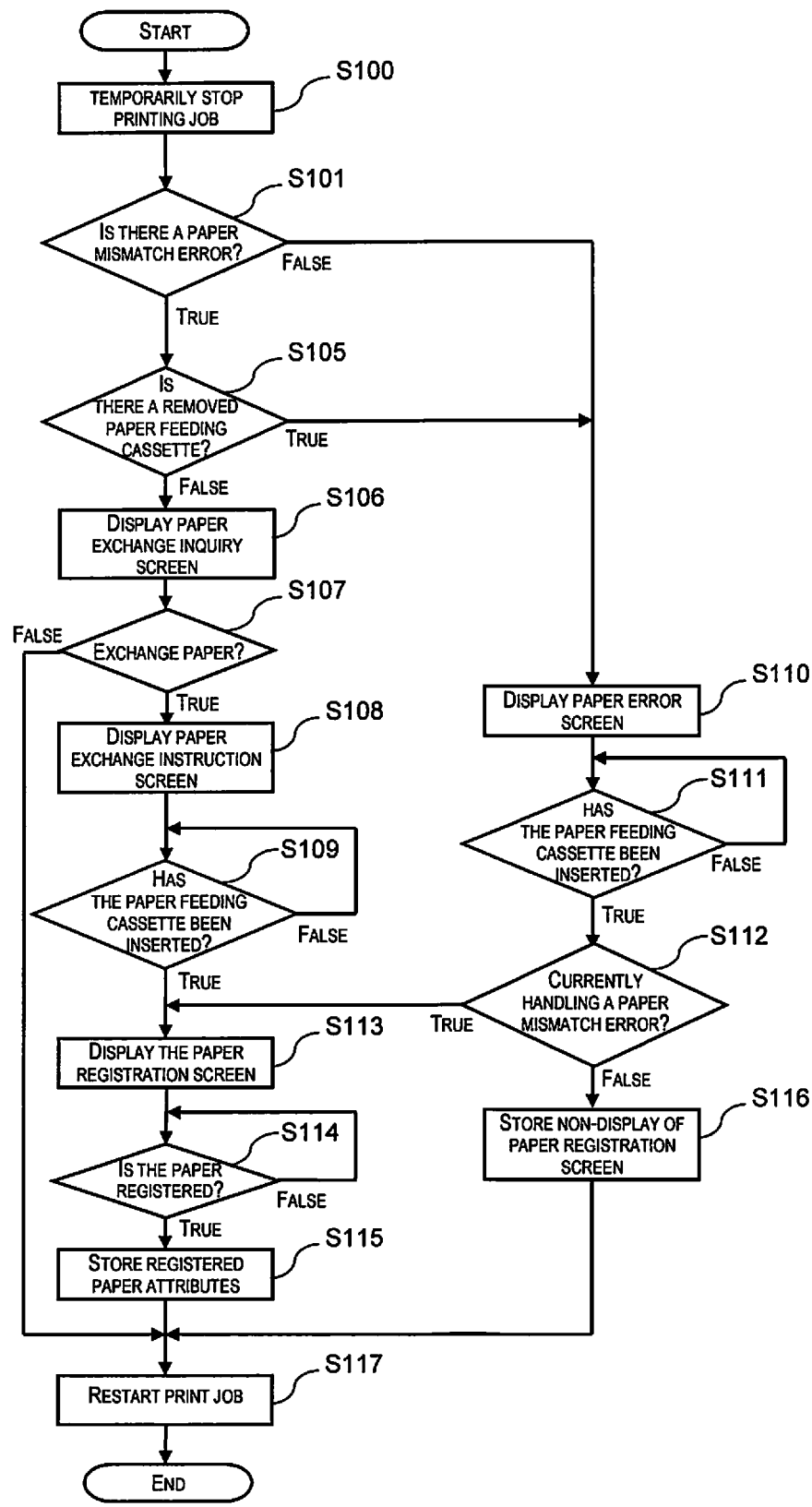
FIG. 2 is a flow chart of the embodiment of the present invention.

FIG. 2 shows the printer 1 control sequence that is activated by the occurrence of a paper error during execution of a printing job.

When a predetermined paper error occurs during the period from when the control unit 30 acquires the printing job until that printing job execution is completed, the control unit 30 temporarily stops execution of the printing job (S100), and determines whether or not the type of paper error that occurred is a mismatch error (S101). A paper mismatch error is a state in which paper attributes that match the paper attributes specified with a printing job (size, paper quality) are not registered for the paper feeding units 51, 52, and 53. Paper errors that are not mismatch errors include paper jams, running out of paper, and paper feeding cassette removal.

When it is determined that there is a paper mismatch error, the control unit 30 determines whether or not there is a removed paper feeding cassette (S105).

Figure 3A:
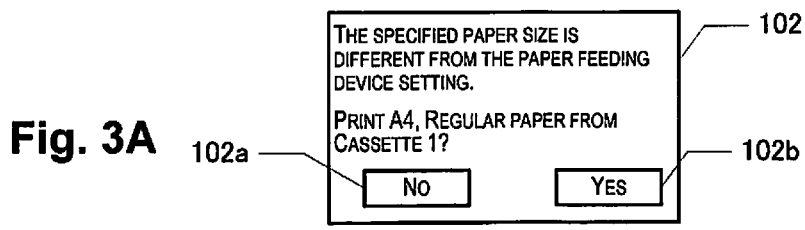
FIGS. 3A to 3F are screen configuration diagrams of the embodiment of the present invention.

When there is not a removed paper feeding cassette, the control unit 30 displays on the display unit 10 a paper exchange inquiry screen 102 shown in FIG. 3A (S106). Displayed on the paper exchange inquiry screen 102 are a Yes button 102b for ignoring the paper attributes specified with the printing job and executing printing, and a No button 102a for changing to paper of the attributes specified with the printing job. When the Yes button 102b is selected, the control unit 30 determines that it is unnecessary to change the paper, and when the No button 102a is selected, it determines that the paper needs to be changed (S107).

When it is determined that it is not necessary to change the paper, the control unit 30 restarts execution of the printing job (S117). At this time, the printing job is executed using the paper feeding cassette 52 which has been predetermined to be used with priority.

Figure 3B:
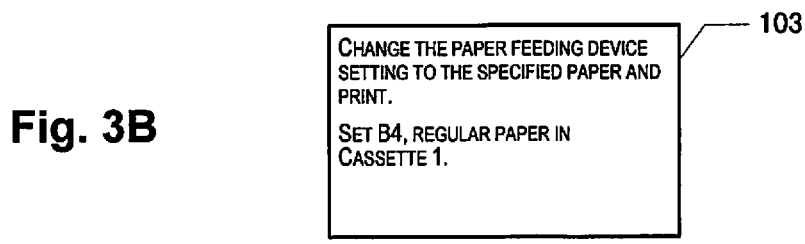

When it is determined that the paper needs to be changed, the control unit 30 displays a paper exchange instruction screen 103 shown in FIG. 3B. Displayed in the paper exchange instruction screen 103 are the name of the paper feeding unit used with the printing job (Cassette 1) and the paper attributes specified with the printing job (B4, Regular paper). It is possible to decide in advance the paper feeding unit to use for switching paper when executing a printing job for which a paper mismatch error has occurred. With this embodiment, the paper feeding cassette 52 identified as Cassette 1 is used.

During the period when the paper exchange instruction screen 103 is displayed on the display unit 10, the control unit 30 continues to determine whether the paper feeding cassette is reinserted after being removed, or if the paper of the multipurpose tray is replaced after being taken out (S109). Following, the paper feeding cassette being reinserted after being removed, and the paper of the multipurpose tray being replaced after being removed are regarded as paper feeding unit specific operations.

When it is determined that the paper feeding unit specific operation has been performed, the control unit 30 displays the paper registration screen 101 shown in FIG. 1 on the display unit 10 (S113). Displayed on the paper registration screen 101 are the name of the paper feeding unit that is correlated and stores the paper attributes (Cassette 1), paper attributes 101b specified with the printing job (B4, Regular paper), OK button 101c for registering the displayed paper attributes, and Change button 101d for registering attributes different from the displayed paper attributes. On the paper registration screen 101, the paper attributes specified with the printing job (B4, Regular paper) are displayed as registration candidates, so it is possible for the user to register the paper attributes simply by confirming whether or not they match the paper attributes he set himself. When the Change button 101d is selected, the control unit 30 displays the paper attributes selection screen 107 shown in FIG. 3F on the display unit 10. On the paper attributes selection screen 107 are displayed to plurality of paper attributes 102a, 102b, and 102c, Return button 108d for displaying the previous screen, and OK button 108e for registering the selected paper attributes.

During the period that the paper registration screen 101 is displayed, the control unit 30 continues to determine whether or not the paper attributes are registered (S114). When the paper attributes are registered, the control unit 30 correlates the registered paper attributes with the paper feeding unit and stores them in the non-volatile storage medium (S115), and restarts execution of the printing job (S117).

Figure 3C:
Figure 3D:
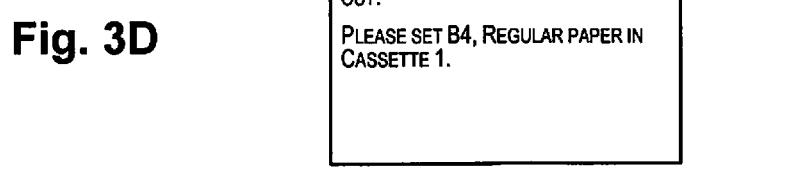
Figure 3E:
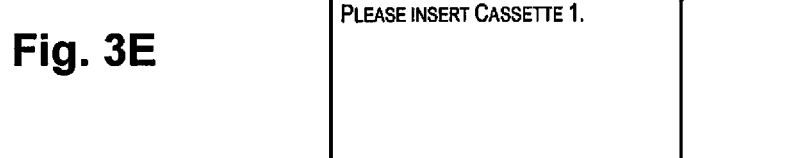
Figure 3F:
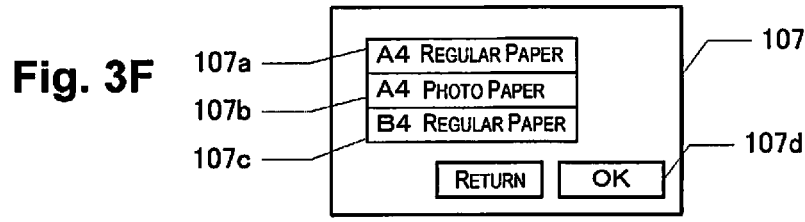

When the control unit 30 determines there is a paper error other than a mismatch error (when the judgment is false at S101), and when it determines there is a mismatch error (when the judgment is true at S101), after that, when it is determined that there is a removed paper feeding cassette (when the judgment is true at S105), one of the paper error screens shown in FIGS. 3C, 3D, and 3E is displayed on the display unit 10 (S110). The paper error screen 103 shown in FIG. 3C is displayed when paper is jammed, the paper error screen 104 shown in FIG. 3D is displayed when the paper of the paper feeding cassette used with the printing job is running short, and the paper error screen 105 shown in FIG. 3E is displayed when any of the paper feeding cassettes is removed.

During the period that the paper error screens 103, 104, and 105 are displayed on the display unit 10, the control unit 30 continues determining whether or not the paper feeding unit specific operation has been performed (S111).

When it is determined that the paper feeding unit specific operation has been performed, the control unit 30 determines whether or not handling is being done for the paper mismatch error (S112). Specifically, a determination is made of whether or not the cause of the paper error occurring is a paper mismatch error.

When it is determined that handling is being done for the paper mismatch error, as described previously, the control unit 30 displays the paper registration screen 101 on the display unit 10 (S113), and after storing the paper attributes (S115), restarts execution of the printing job (S116). Specifically, when the paper feeding unit specific operation is performed after the occurrence of a paper mismatch error, the control unit 30 displays the paper registration screen 101 on the display unit 10 without exception. This is because the goal of the paper feeding unit specific operation performed after the paper mismatch error is to exchange the paper.

Meanwhile, when it is determined that this is not recovery from a mismatch error, the control unit 30 stores the fact that the paper registration screen is not to be displayed in the non-volatile storage medium (S116), and subsequently, restarts execution of the printing job (S117). Specifically, during the recovery process from a paper error, the control unit 30 does not display the paper registration screen except when the paper feeding unit specific operation is performed after a mismatch error, and the fact of not displaying is correlated with the paper feeding unit for which the specific operation was performed, and stored in the non-volatile storage medium. This is because as long as no mismatch error occurs, during the period from when the user sends the printing job until it ends, it is not necessary to exchange the paper in the paper feeding unit. By doing this, it is possible to suppress the problem of the user being forced to input paper attributes unnecessarily and delaying printing. When the paper feeding unit specific operation is performed after a paper error other than a mismatch error occurs, cases of paper jamming or running short occurring and cases of the paper feeding cassette being removed during execution of the printing job are included. When a paper jam has occurred, it is possible that the specific operation will be performed not only for the paper feeding unit that supplied the jammed paper, but for all the paper feeding units. Therefore, when the paper feeding unit specific operation was performed after the paper jam occurred, regardless of for which paper feeding unit the paper jam occurred, the control unit 30 does not display the paper registration screen for any of the paper feeding units.

3. Other Embodiments

Moreover, the technical scope of the present invention is not limited by the embodiments described above, and of course it is possible to add various changes within a scope that does not stray from the gist of the present invention.

For example, it possible to suitably change to what level of detail the paper attributes are classified. For example, it is also possible to add thickness in addition to the paper size and paper quality as a paper attribute classification item, and conversely, it is possible to have only size as the paper attribute classification item. Also, with the embodiment noted above, the reinsertion of the paper feeding cassette and the replacement of paper in the paper feeding unit were the triggers for display of the paper registration screen, but it is also possible to have either of removal or insertion of the paper feeding cassette as the trigger for display of the paper registration screen, or to have either of placement of paper in the multipurpose tray or taking out of paper from the multipurpose tray as the display trigger.

It is also possible to equip a sensor that detects the attributes of paper in a state held in the paper feeding unit. When equipping this kind of sensor, a determination is made of whether or not the attributes of the paper held in the paper feeding unit are consistent with the paper attributes registered in the paper feeding unit, and when they are consistent, it is possible to not have the paper registration screen displayed. For example, when a sensor is equipped that detects the size of the paper held in the paper feeding unit, when the paper size detected by the sensor matches with the paper size registered in the corresponding paper feeding unit, it is also possible to not display the paper registration screen. Moreover, in this case, there is no guarantee that the paper attributes that the sensor cannot detect (e.g. paper quality or thickness) match. However, since it is not necessary to exchange paper for paper errors other than paper mismatch errors that occur during execution of the printing job, if the paper size matches, it is preferable to regard this as the paper quality matching, and to omit the trouble of registering the paper attributes.

Also, when a sensor is equipped that detects the attributes of the paper in a state held in the paper feeding unit, when the paper attributes that are consistent with the paper attributes specified with the printing job are in a state not consistent with the attributes of the paper held in the paper feeding unit detected by the sensor, this can be regarded as a mismatch error.

However, when a paper error other than a mismatch error occurs, it can't be said that there is no possibility of the paper feeding unit paper being exchanged. In light of that, by storing the fact that the paper registration screen was not displayed, based on that fact, it is possible to verify whether or not the paper of the paper feeding unit was exchanged. In specific terms, when the fact that the paper registration screen was not displayed is stored, the control unit 30 detects the attributes of the paper held by the paper feeding unit using the sensor, and determines whether the paper attributes correlated to that paper feeding unit and stored are consistent with the detected paper attributes. Then, when the verification results are that they are not consistent, the control unit 30 temporarily stops execution of the printing job and gives a report, gives instructions for switching the paper, and gives instructions for registering the paper attributes. As a result of the instructions, when the attributes of the paper held by the paper feeding unit have become consistent with the stored paper attributes, the control unit 30 deletes storage of the fact that the paper registration screen was not displayed. Meanwhile, when the fact that the paper registration screen was not displayed is not stored, the control unit 30 shortens the printing time by executing the printing job without detecting the attributes of the paper held by the paper feeding unit using the sensor. Specifically, by storing the fact that the paper registration screen was not displayed, it is possible to inhibit the waste of performing that process when it is not necessary to do the process of detecting the attributes of the paper held in the paper feeding unit and comparing it. It is also possible to detect the attributes of the paper in a state held in the paper feeding unit with the sensor before execution of the printing job, or to detect the attributes of the paper in a state supplied to the printing unit with the sensor during execution of the printing job. The non-display conditions may include a user operation being performed on the paper feeding unit after a paper jam or paper running short midway in one printing job (a printing job consisting of a plurality of pages for which the same printing paper size is specified or the like), and may not include the operation being performed after a paper jam or paper running short during a different printing job.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printer comprising:
   a printing unit configured and arranged to execute printing based on a printing job;
   a paper feeding unit configured and arranged to hold paper;
   a display configured and arranged to display a paper registration screen for registering or confirming attributes of the paper; and
   a control unit configured to determine whether or not to display the paper registration screen, determine to display the paper registration screen after operation to the paper feeding unit in response to a mismatch error, and determine not to display the paper registration screen after the operation to the paper feeding unit in response to a jamming of the paper, the control unit being configured to display the paper registration screen during period of executing the printing job.

2. The printer according to claim 1, wherein
the period starts when the control unit acquires one printing job as the printing job and ends when executing of the one printing job is completed.

3. The printer according to claim 1, wherein
when the attributes of the paper used with the printing job are consistent with the attributes of the paper registered with the paper feeding unit, the control unit is configured to determine not to display the paper registration screen after the operation to the paper feeding unit.

4. The printer according to claim 3, wherein
the attributes of the paper used with the printing job are the attributes of the paper specified with the printing job.

5. The printer according to claim 4, further comprising
a sensor configured and arranged to detect the attributes of the paper held in the paper feeding unit, wherein
the attributes of the paper used with the printing job are the attributes of the paper detected by the sensor.

6. The printer according to claim 4, further comprising
a sensor configured and arranged to detect the attributes of the paper used with the printing job, wherein
when the paper registration screen is not displayed in response to the jamming of the paper, the control unit is configured to detect the attributes of the paper using the sensor, and when the paper registration screen is displayed in response to the mismatch error, the control unit is configured not to detect the attributes of the paper using the sensor.

7. The printer according to claim 6, further comprising
a plurality of the paper feeding units, wherein
when the paper registration screen is not displayed in response to the jamming of the paper for any one of the paper feeding units, the control unit is configured not to display the paper registration screen for any of the paper feeding units.

8. The printer according to claim 1, wherein
the control unit is configured to display the paper registration screen during the period of executing the printing job other than between different printing jobs.

9. A printer system comprising:
a printing unit configured and arranged to execute printing;
a paper feeding unit configured and arranged to hold paper;
a display configured and arranged to display a paper registration screen for registering or confirming attributes of the paper according to operation to the paper feeding unit; and
a control unit configured to determine whether or not to display the paper registration screen, determine to display the paper registration screen after the operation to the paper feeding unit is performed in response to a mismatch error, and determine not to display the paper registration screen after the operation to the paper feeding unit is performed in response to a jamming of the paper,
the control unit being configured to display the paper registration screen during a period of executing a printing job, the mismatch error being satisfied when the attributes of the paper used with a printing job are not consistent with the attributes of the paper registered in the paper feeding unit, the jamming of the paper being satisfied when the attributes of the paper used with the printing job are consistent with the attributes of the paper registered in the paper feeding unit.

* * * * *